US012615439B2

(12) United States Patent
Cooprider et al.

(10) Patent No.: US 12,615,439 B2
(45) Date of Patent: Apr. 28, 2026

(54) CAMERA MONITORING SYSTEM INCLUDING HMI-BASED PANNING FEATURES

(71) Applicant: Stoneridge Electronics AB, Solna (SE)

(72) Inventors: Troy Otis Cooprider, White Lake, MI (US); Banuprakash Murthy, Novi, MI (US); Arunshankar Dhandayuthapany, Auburn Hills, MI (US)

(73) Assignee: Stoneridge Electronics AB, Solna (SE)

( * ) Notice: Subject to any disclaimer, the term of this patent is extended or adjusted under 35 U.S.C. 154(b) by 71 days.

(21) Appl. No.: 18/657,863

(22) Filed: May 8, 2024

(65) Prior Publication Data

US 2025/0350838 A1     Nov. 13, 2025

(51) Int. Cl.
| | |
|---|---|
| *H04N 23/695* | (2023.01) |
| *H04N 7/18* | (2006.01) |
| *H04N 23/62* | (2023.01) |
| *H04N 23/66* | (2023.01) |

(52) U.S. Cl.
CPC ........... *H04N 23/695* (2023.01); *H04N 7/181* (2013.01); *H04N 23/62* (2023.01); *H04N 23/66* (2023.01)

(58) Field of Classification Search
CPC ...... H04N 23/695; H04N 7/181; H04N 23/62; H04N 23/66
USPC ................... 348/148; 345/173, 174; 455/420
See application file for complete search history.

(56) References Cited

U.S. PATENT DOCUMENTS

| | | | | |
|---|---|---|---|---|
| 2007/0222764 A1* | 9/2007 | Wang | .................... | G06F 1/1626 345/173 |
| 2010/0304731 A1* | 12/2010 | Bratton | ................ | H04N 23/695 348/E5.042 |
| 2012/0127115 A1* | 5/2012 | Gannon | .............. | G06F 3/03547 345/173 |
| 2014/0085472 A1* | 3/2014 | Lu | ............................. | B60R 1/26 348/148 |
| 2015/0042803 A1* | 2/2015 | Heinemann | ................ | B60R 1/26 348/148 |
| 2017/0341583 A1* | 11/2017 | Zhang | .................... | H04N 7/181 |
| 2020/0339038 A1* | 10/2020 | Brett | ......................... | B60R 1/08 |

(Continued)

FOREIGN PATENT DOCUMENTS

| | | |
|---|---|---|
| DE | 102012004793 | 9/2013 |
| EP | 3756949 | 12/2020 |

OTHER PUBLICATIONS

International Search Report and Written Opinion for International Patent Application No. PCT/EP2024/062751 dated Nov. 19, 2024.

*Primary Examiner* — Thai Q Tran
*Assistant Examiner* — Stephen R Smith
(74) *Attorney, Agent, or Firm* — Carlson, Gaskey & Olds, P.C.

(57) ABSTRACT

A method for providing panning for a camera monitor system (CMS) includes displaying image feeds from a plurality of CMS cameras on a plurality of CMS displays. The image feeds depict an environment surrounding a commercial vehicle. The method also includes providing a human-machine interface (HMI) on a touchscreen display, receiving at least one panning command through the HMI, and, based on the at least one panning command, panning the image feed on one of the plurality of CMS displays from a default view to a panned view. A camera monitor system (CMS) is also disclosed.

16 Claims, 6 Drawing Sheets

(56)             References Cited

U.S. PATENT DOCUMENTS

2021/0152750  A1*    5/2021  Wakamatsu  ............. G02B 7/08
2022/0258760  A1      8/2022  Le Bourgeois et al.
2022/0292841  A1*    9/2022  Corrodi  .................... B60R 1/26
2024/0380978  A1*   11/2024  Geissler  ............... H04N 23/695
2025/0170951  A1*    5/2025  Barrellon  ............... B60Q 1/346

* cited by examiner

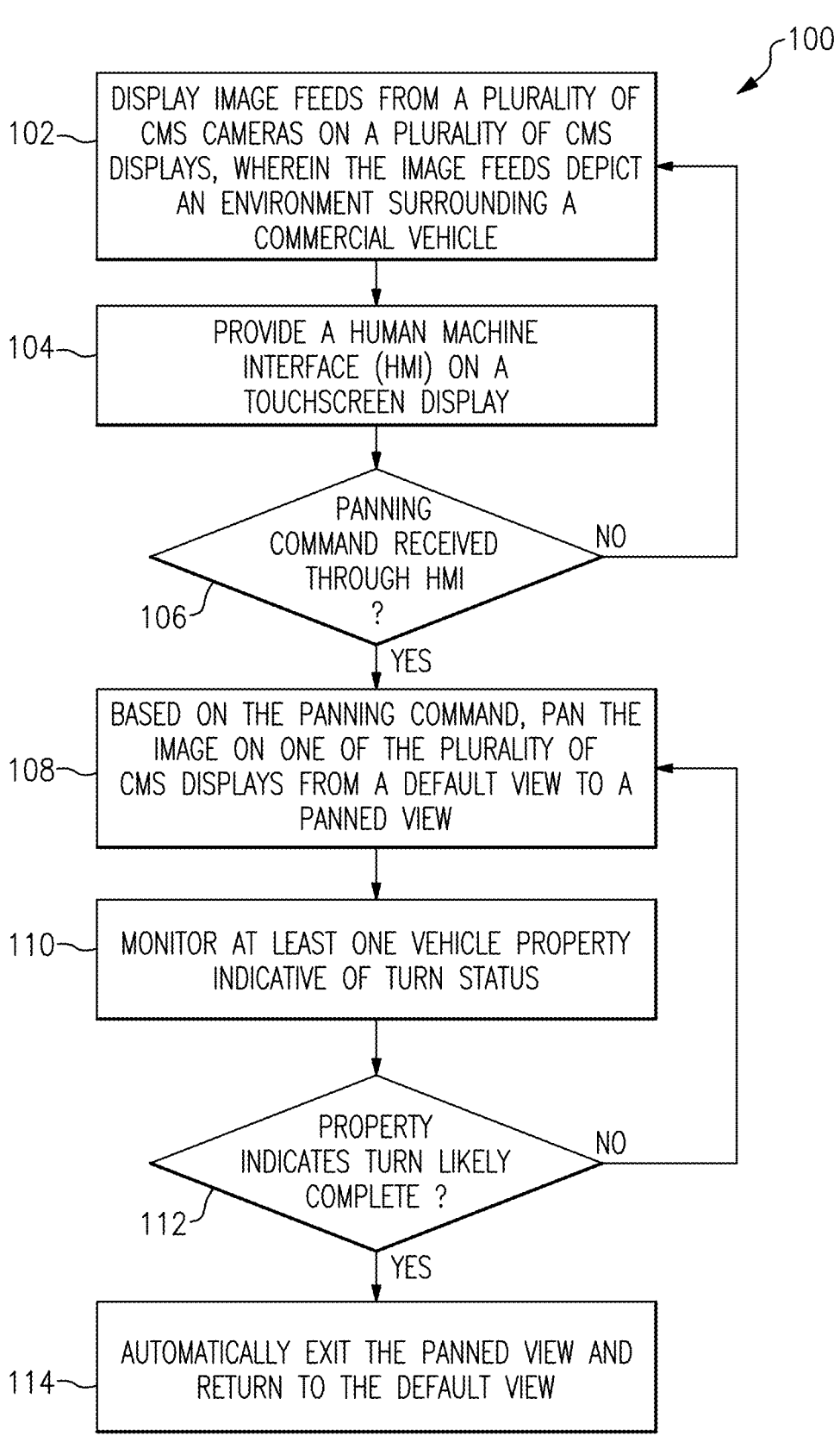

100

102— DISPLAY IMAGE FEEDS FROM A PLURALITY OF CMS CAMERAS ON A PLURALITY OF CMS DISPLAYS, WHEREIN THE IMAGE FEEDS DEPICT AN ENVIRONMENT SURROUNDING A COMMERCIAL VEHICLE

104— PROVIDE A HUMAN MACHINE INTERFACE (HMI) ON A TOUCHSCREEN DISPLAY

106— PANNING COMMAND RECEIVED THROUGH HMI ?   NO

YES

108— BASED ON THE PANNING COMMAND, PAN THE IMAGE ON ONE OF THE PLURALITY OF CMS DISPLAYS FROM A DEFAULT VIEW TO A PANNED VIEW

110— MONITOR AT LEAST ONE VEHICLE PROPERTY INDICATIVE OF TURN STATUS

112— PROPERTY INDICATES TURN LIKELY COMPLETE ?   NO

YES

114— AUTOMATICALLY EXIT THE PANNED VIEW AND RETURN TO THE DEFAULT VIEW

FIG.5

CAMERA MONITORING SYSTEM INCLUDING HMI-BASED PANNING FEATURES

TECHNICAL FIELD

This disclosure relates to a camera monitor system (CMS), and more particularly to a method and apparatus for a CMS that includes human-machine interface (HMI) based panning features.

BACKGROUND

Vehicle camera systems for mirror replacement or for supplementing mirror views are utilized in commercial vehicles to enhance the ability of a vehicle operator to see a surrounding environment of the commercial vehicle. Camera monitor systems (CMS) utilize one or more cameras to provide an enhanced field of view to a vehicle operator. In some examples, the mirror replacement systems cover a larger field of view than a conventional mirror, or include views that are not fully obtainable via a conventional mirror.

Some CMS include automatic panning features, whereby a field of view is automatically panned during occasions such as turns, where a the driver's area of interest may differ from what would otherwise be displayed. However, automatic panning is challenging to implement for some commercial vehicles, such as tankers and car trailers.

SUMMARY

A method for providing panning for a camera monitor system (CMS) according to an example embodiment of the present disclosure includes displaying image feeds from a plurality of CMS cameras on a plurality of CMS displays. The image feeds depict an environment surrounding a commercial vehicle. The method also includes providing a human-machine interface (HMI) on a touchscreen display, receiving at least one panning command through the HMI, and, based on the at least one panning command, panning the image feed on one of the plurality of CMS displays from a default view to a panned view.

In a further embodiment of the foregoing embodiment, the providing the HMI on the touchscreen display includes providing a horizontal bar on the touchscreen display, which controls horizontal panning on a first one of the plurality of CMS displays. The receiving the at least one panning command includes receiving a panning command through user interaction with the horizontal bar.

In a further embodiment of any of the foregoing embodiments, the horizontal bar is a first horizontal bar. The providing the HMI on the touchscreen display includes providing a second horizontal bar on the touchscreen display, which is separate from the first horizontal bar, and which controls horizontal panning on a second one of the plurality of CMS displays that is different from the first one of the plurality of CMS displays. The receiving the at least one panning command includes receiving an additional panning command through user interaction with the second horizontal bar.

In a further embodiment of any of the foregoing embodiments, the providing the HMI on the touchscreen display includes providing a vertical bar on the touchscreen display, which controls vertical panning on the first one of the CMS displays. The receiving the at least one panning command includes receiving an additional panning command through user interaction with the vertical bar.

In a further embodiment of any of the foregoing embodiments, the touchscreen display is the first one of the plurality of CMS displays.

In a further embodiment of any of the foregoing embodiments, the receiving the at least one panning command includes receiving a drag command on the HMI in which the user drags their fingertip in a first direction. The panning the image feed includes panning the image feed in a second direction that is opposite the first direction to emulate the user having dragged the image feed in the first direction.

In a further embodiment of any of the foregoing embodiments, the method includes determining, based on a property of the commercial vehicle, that the commercial vehicle has likely completed a turn. The method also includes automatically exiting the panned view and returning to the default view of the image feed based on the determining.

In a further embodiment of any of the foregoing embodiments, the determining includes determining that the commercial vehicle has likely completed a turn based on, while the panned view is being provided, a steering angle or a trailer angle of the commercial vehicle having decreased from being above a predefined angle threshold to being below the predefined angle threshold.

In a further embodiment of any of the foregoing embodiments, the determining includes determining that the commercial vehicle has likely completed a turn based on, while the panned view is being provided, a speed of the commercial vehicle having increased from being below a predefined speed threshold to being above the predefined speed threshold.

In a further embodiment of any of the foregoing embodiments, each image feed is a cropped version of a larger, non-cropped image feed, and the panning includes adjusting a cropping of the larger, non-cropped image feed for said one of the plurality of CMS displays.

A camera monitor system (CMS) according to an example embodiment of the present disclosure includes a plurality of CMS cameras configured to record images of an environment surrounding a commercial vehicle, a plurality of CMS displays, and a CMS electronic control unit (ECU). The CMS ECU is configured to display image feeds from the plurality of CMS cameras on the plurality of CMS displays, provide a human-machine interface (HMI) on a touchscreen display, receive at least one panning command through the HMI, and, based on the at least one panning command, pan the image feed on one of the plurality of CMS displays from a default view to a panned view.

In a further embodiment of the foregoing embodiment, to provide the at least one HMI element on the touchscreen display, the CMS ECU is configured to provide a horizontal bar on the touchscreen display, which controls horizontal panning on a first one of the plurality of CMS displays. The CMS ECU is configured to receive the at least one panning command through user interaction with the horizontal bar.

In a further embodiment of any of the foregoing embodiments, the horizontal bar is a first horizontal bar. The CMS ECU is configured to provide a second horizontal bar on the touchscreen display, which is separate from the first horizontal bar, and which controls horizontal panning on a second one of the plurality of CMS displays that is different from the first one of the plurality of CMS displays. The CMS ECU is configured to receive the at least one panning command through user interaction with the second horizontal bar.

In a further embodiment of any of the foregoing embodiments, to provide the at least one HMI element on the touchscreen display, the CMS ECU is configured to provide a vertical bar on the touchscreen display, which controls vertical panning on the first one of the CMS displays. To receive the at least one panning command, the CMS ECU is configured to receive an additional panning command through user interaction with the vertical bar.

In a further embodiment of any of the foregoing embodiments, the touchscreen display is the first one of the plurality of CMS displays.

In a further embodiment of any of the foregoing embodiments, to receive the at least one panning command, the CMS ECU is configured to receive a drag command on the HMI in which the user drags their fingertip in a first direction. To pan the image feed, the CMS ECU is configured to pan the image feed in a second direction that is opposite the first direction to emulate the user having dragged the image feed in the first direction.

In a further embodiment of any of the foregoing embodiments, the CMS ECU is configured to determine, based on a property of the commercial vehicle, that the commercial vehicle has likely completed a turn. The CMS ECU is also configured to automatically exit the panned view and return to the default view of the image feed based on the determination.

In a further embodiment of any of the foregoing embodiments, to determine, based on a property of the commercial vehicle, that the commercial vehicle has likely completed a turn, the CMS ECU is configured to determine that, while the panned view is being provided, a steering angle or a trailer angle of the commercial vehicle has decreased from being above a predefined angle threshold to being below the predefined angle threshold.

In a further embodiment of any of the foregoing embodiments, to determine, based on a property of the commercial vehicle, that the commercial vehicle has likely completed a turn, the CMS ECU is configured to determine that, while the panned view is being provided, a speed of the commercial vehicle has increased from being below a predefined speed threshold to being above the predefined speed threshold.

In a further embodiment of any of the foregoing embodiments, each image feed is a cropped version of a larger, non-cropped image feed. To pan the image feed on one of the plurality of CMS displays from a default view to a panned view, the CMS ECU is configured to adjust a cropping of the larger, non-cropped image feed for said one of the plurality of CMS displays.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The disclosure can be further understood by reference to the following detailed description when considered in connection with the accompanying drawings wherein:

FIG. 5 is a flowchart of an example method for providing HMI-based panning for a CMS.

DETAILED DESCRIPTION

Schematic views of a commercial vehicle 10 are illustrated in FIGS. 1-4. The commercial vehicle 10 includes a vehicle cab or "tractor" 12 for pulling a trailer 14, where the trailer 14 pivots with respect to the tractor 12 during turns. Although the commercial vehicle 10 is depicted as a commercial truck with a single trailer in this disclosure, it is understood that other commercial vehicle configurations may be used (e.g., different types or quantities of trailers).

A pair of camera arms 16A-B include a respective base that is secured to, for example, the tractor 12. A pivoting arm is supported by the base and may articulate relative thereto. At least one rearward facing camera 20A-B is arranged respectively on or within the camera arms 16A-B. The exterior cameras 20A-B respectively provide an exterior field of view $FOV_{EX1}$, $FOV_{EX2}$ that each include at least one of Class II and Class IV views (FIG. 2), which are legally prescribed views in the commercial trucking industry.

The Class II view on a given side of the commercial vehicle 10 is a subset of the class IV view of the same side of the commercial vehicle 10. Multiple cameras also may be used in each camera arm 16A-B to provide these views, if desired. Class II (narrow) and Class IV (wide angle) views are defined in European R46 legislation, for example, and the United States and other countries have similar drive visibility requirements for commercial trucks. Any reference to a "Class" view is not intended to be limiting, but is intended as an example of the type of view provided to a display from a particular camera.

Each camera arm 16A-16B may also provide a housing that encloses electronics, e.g., a controller, that are configured to provide various features of the CMS 15. The camera arms 16A-B may be mounted either at a roof-mount location over the cab door (as shown), or on a door-mounted bracket or station, for example.

Figure 2:
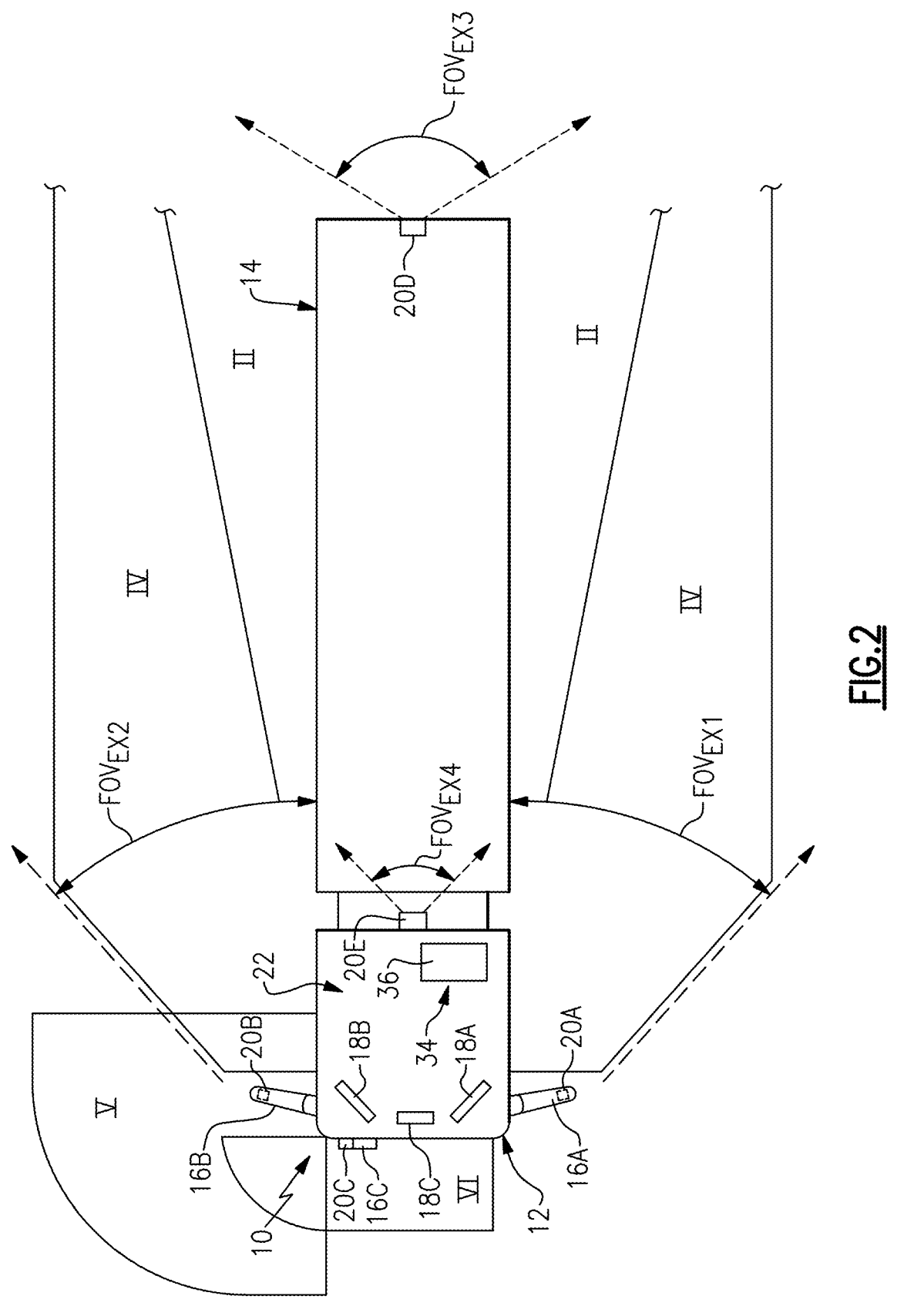
FIG. 2 is a schematic birds-eye view of the commercial truck of FIG. 1 with a CMS providing Class II, Class IV, Class V, Class VI, and Class VIII views.

If video of Class V and/or Class VI views is also desired, a camera housing 16C and camera 20C may be arranged at or near the front of the commercial vehicle 10 to provide those views (FIG. 2).

A backup camera 20D may be provided which provides a field of view $FOV_{EX3}$. The backup camera 20D may be mounted at a top/centerline of the trailer, at a bumper/bed level of the trailer, or at a top-corner of the back of the trailer, for example. Alternatively, or in addition to the rear trailer camera, a "fifth wheel camera" 20E may be provided that is mounted to a rear of the tractor 12 and that provides a field of view $FOV_{EX4}$. The fifth wheel camera 20E may be mounted anywhere between the lateral plane of the fifth wheel fixture and the top/roof edge of the tractor, for example.

Figure 3:
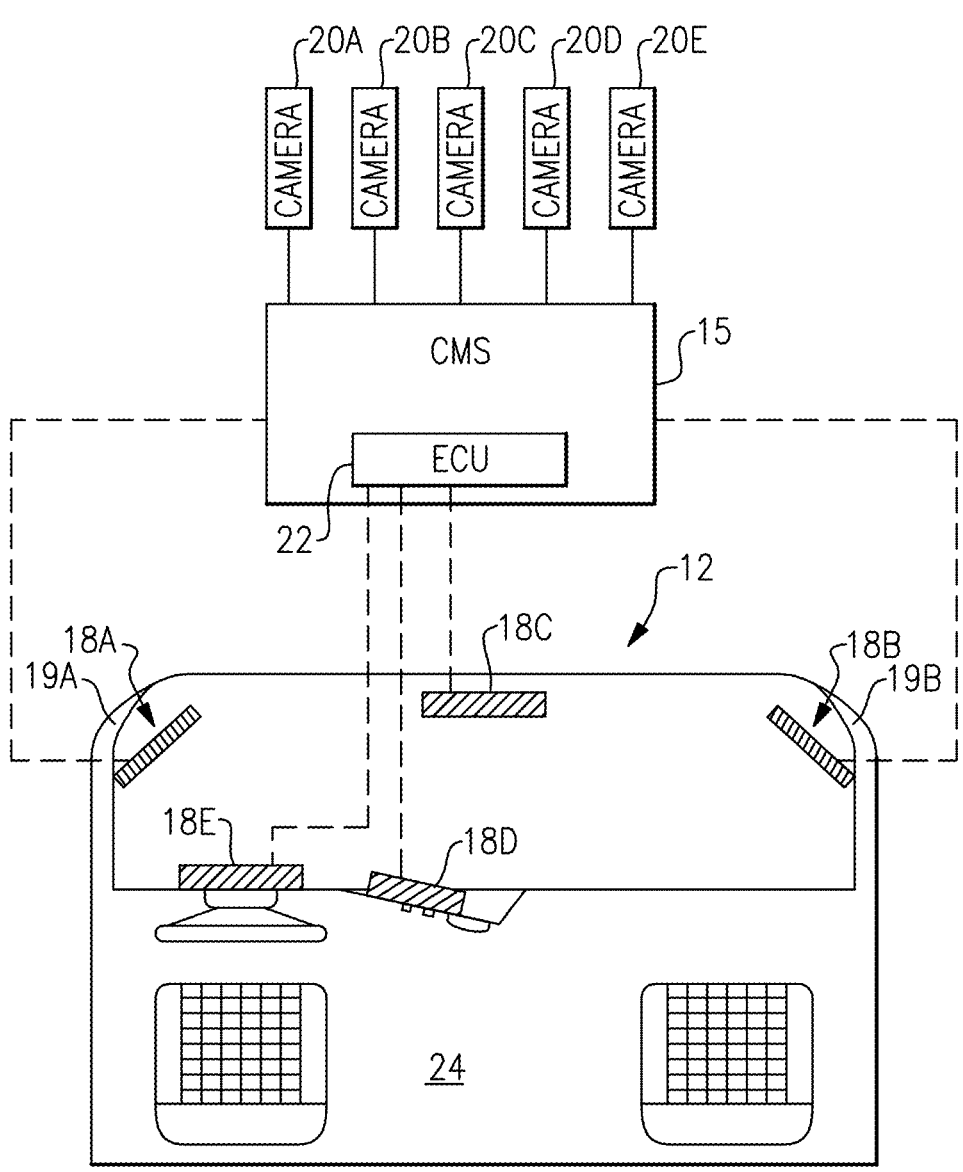
FIG. 3 is a schematic top view of an example vehicle cabin interior.
Figure 4:
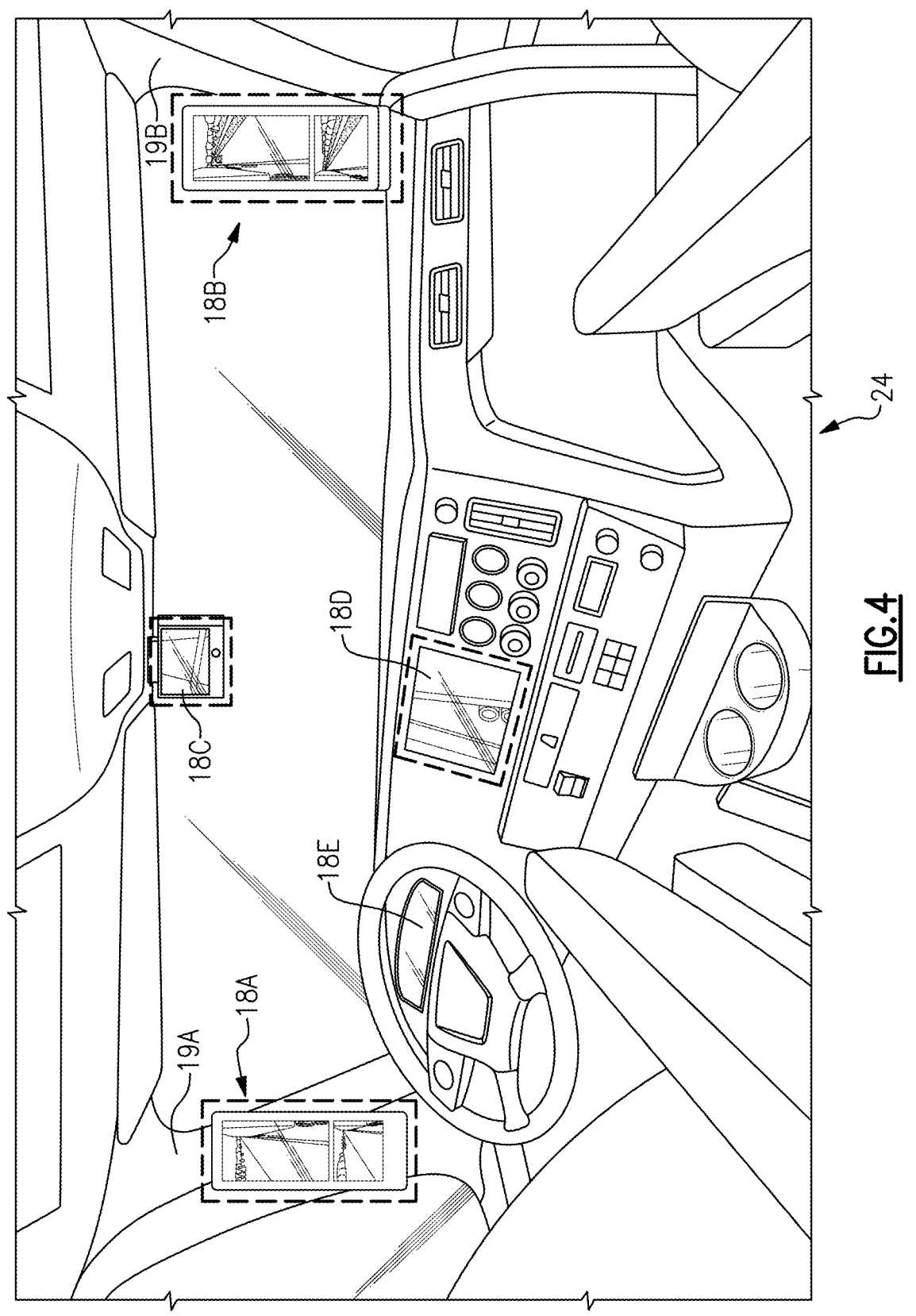
FIG. 4 is a perspective view of the vehicle cabin interior of FIG. 3.

FIG. 3 is a schematic top view of an example vehicle cabin interior 24, and FIG. 4 is a perspective view of the vehicle cabin interior 24. Referring now to FIGS. 3-4 with continued reference to FIGS. 1-2, electronic displays 18A-E (e.g., which may be video displays, such as LCD displays) and cameras 20A-E are shown. The various electronic displays 18A-E and cameras 20A-E are part of a camera monitor system (CMS) 15, and therefore act as CMS displays and CMS cameras. As used herein, a "CMS camera" 20 is a camera configured to record images of an environment surrounding a commercial vehicle 10, and a "CMS display" 18 is an electronic display (e.g., an LCD) that is configured to display image feeds from those cameras.

The CMS 15 includes a CMS electronic control unit (ECU) 22 that acts as a controller and includes processing circuitry that supports operation of the CMS 15. The CMS ECU 22 is operatively connected to memory (which may include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The processing circuitry may include one or more microprocessors, microcontrollers, application specific integrated circuits (ASICs), or the like.

The CMS displays 18A-B are arranged on each of the driver and passenger sides within the vehicle cab 12 on or near the A-pillars 19A-B to display Class II and Class IV views on its respective side of the commercial vehicle 10, which provide rear facing side views along the commercial vehicle 10 that are captured by the exterior cameras 20A-B.

As discussed above, if video of Class V and Class VI views are also desired, the camera housing 16C and camera 20C may be arranged at or near the front of the commercial vehicle 10 to provide those views (FIG. 2). In the example of FIG. 3, additional displays 18C-E are provided. Display 18C is arranged in the vehicle cabin interior 24 near the top center of the windshield and may be used to display the Class V and Class VI views, which are toward the front of the commercial vehicle 10, or a backup camera view (from camera 20D or 20E) to the driver. Display 18D is provided in a center console area of the vehicle cabin interior 24, and may be used for other purposes, such as navigation, infotainment, etc. Display 18E may be part of an instrument cluster, for example.

If video of Class VIII views is desired, camera housings can be disposed at the sides and rear of the commercial vehicle 10 to provide fields of view including some or all of the Class VIII zones of the commercial vehicle 10. In such examples, one of the displays 18C-E may include one or more frames displaying the Class VIII views. The displays 18A, 18B, 18C face a driver region within the vehicle cabin interior 24 where an operator is seated on a driver seat.

If desired, the camera arms 16A-B may include conventional mirrors integrated with them as well, although the CMS 15 may be used to entirely replace mirrors. In additional examples, each side can include multiple camera arms, with each arm housing one or more cameras and/or mirrors.

FIG. 5 is a flowchart of an example method 100 for providing HMI-based panning for a CMS 15. The ECU 22 of the CMS 15 displays image feeds from a plurality of CMS cameras 20 on a plurality of CMS displays 18 (step 102), wherein the image feeds depict an environment surrounding commercial vehicle 10. The ECU 22 provides a HMI on a touchscreen display (step 104), which may be one of the CMS displays 18, or may be a separate touchscreen display. The ECU 22 determines if a panning command is received through the HMI in step 106.

If no panning command is received through the HMI element (a "no" to step 106), steps 102-104 are repeated. However, if a panning command is received through the HMI interface Z (a "yes" to step 106), then based on the panning command, the ECU 22 pans the image feed on one of the plurality of CMS displays 20 from a default view to a panned view (step 108).

The ECU 22 monitors at least one vehicle property indicative of turn status (step 110), and determines, based on the at least one vehicle property, whether the commercial vehicle 10 has likely completed a turn (step 112). If the at least one property indicates that the turn is not likely complete (a "no" to step 112), the ECU 22 continues providing the panned view of the image feed (step 108) and continues monitoring the at least one vehicle property (step 110).

If the at least one property indicates that the turn is likely complete (a "yes" to step 112), the ECU 22 automatically exits the panned view and returns to providing the default view of the image feed based on the determination of step 112 (step 114).

The at least one vehicle property indicative of turn status may include any one or more of steering angle, trailer angle (i.e., angle between a central longitudinal axis of the tractor 12 and the trailer 14), or vehicle speed. During turns, commercial vehicles typically increase their steering angle and trailer angle and decrease their speed, and once the turn is complete the steering angle and trailer angle decrease and the commercial vehicle speed increases.

In one or more embodiments, the determining of step 112 includes determining that the commercial vehicle 10 has likely completed a turn based on, while the panned view is being provided, a steering angle of the commercial vehicle 10 has decreased from being above a predefined steering angle threshold to being below the predefined steering angle threshold, which is indicative of turn completion.

In one or more embodiments, the determining of step 112 includes determining that the commercial vehicle 10 has likely completed a turn based on, while the panned view is being provided, a trailer angle of the commercial vehicle 10 has decreased from being above a predefined trailer angle threshold to being below the predefined trailer angle threshold, which is indicative of turn completion.

In one or more embodiments, the determining of step 112 includes determining that the commercial vehicle 10 has likely completed a turn based on, while the panned view is being provided, a speed of the commercial vehicle 10 has increased from being below a predefined speed threshold to being above the predefined speed threshold, which is indicative of turn completion (as a commercial vehicle typically cannot turn above certain speeds).

In one or more embodiments, the panning command received in step 104 corresponds to the user dragging their fingertip in a first direction (e.g., to the right), and the panning performed in step 108 corresponds to the CMS ECU 22 panning the image feed in a second direction (e.g., left) that is opposite the first direction to emulate the user having dragged the image feed in the first direction.

In one or more embodiments, the ECU 22 responds to a diagonal command (e.g., finger drag to the top right) with diagonal panning (e.g., pan to the bottom left). Alternatively, the ECU 22 may interpret a diagonal command (e.g., finger drag to the top right) as just a sideway panning command, such that the "opposite direction" of the command is provided horizontally (e.g., to the left) instead of diagonally (e.g., to the bottom left).

Alternatively, as described in greater detail below, one or more HMI elements may be provided, such as horizontal bars for horizontal panning or vertical bars for vertical panning.

Figure 1:
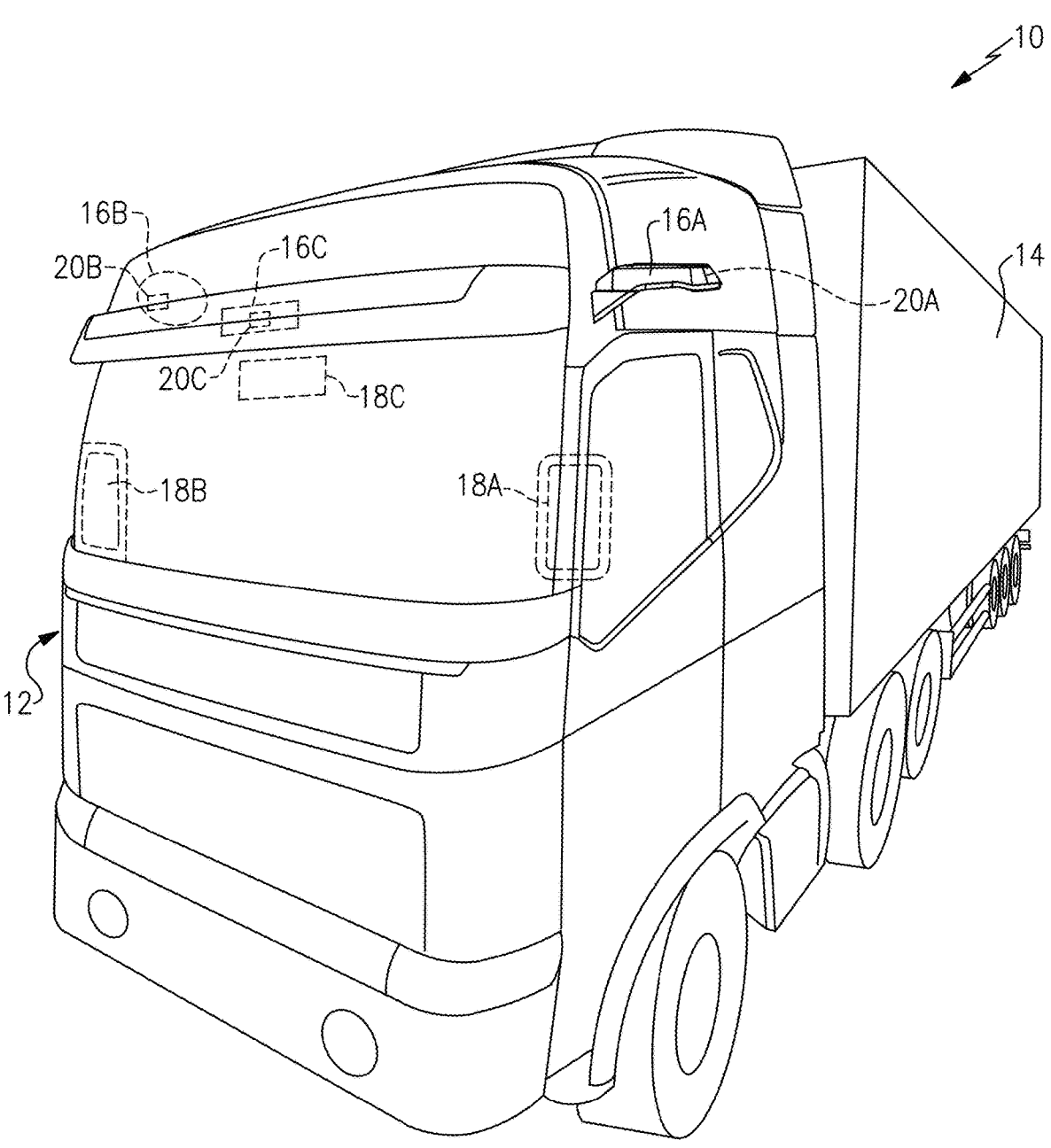
FIG. 1 is a schematic front view of a commercial truck with a camera mirror system (CMS) used to provide at least Class II and Class IV views.
Figure 6:
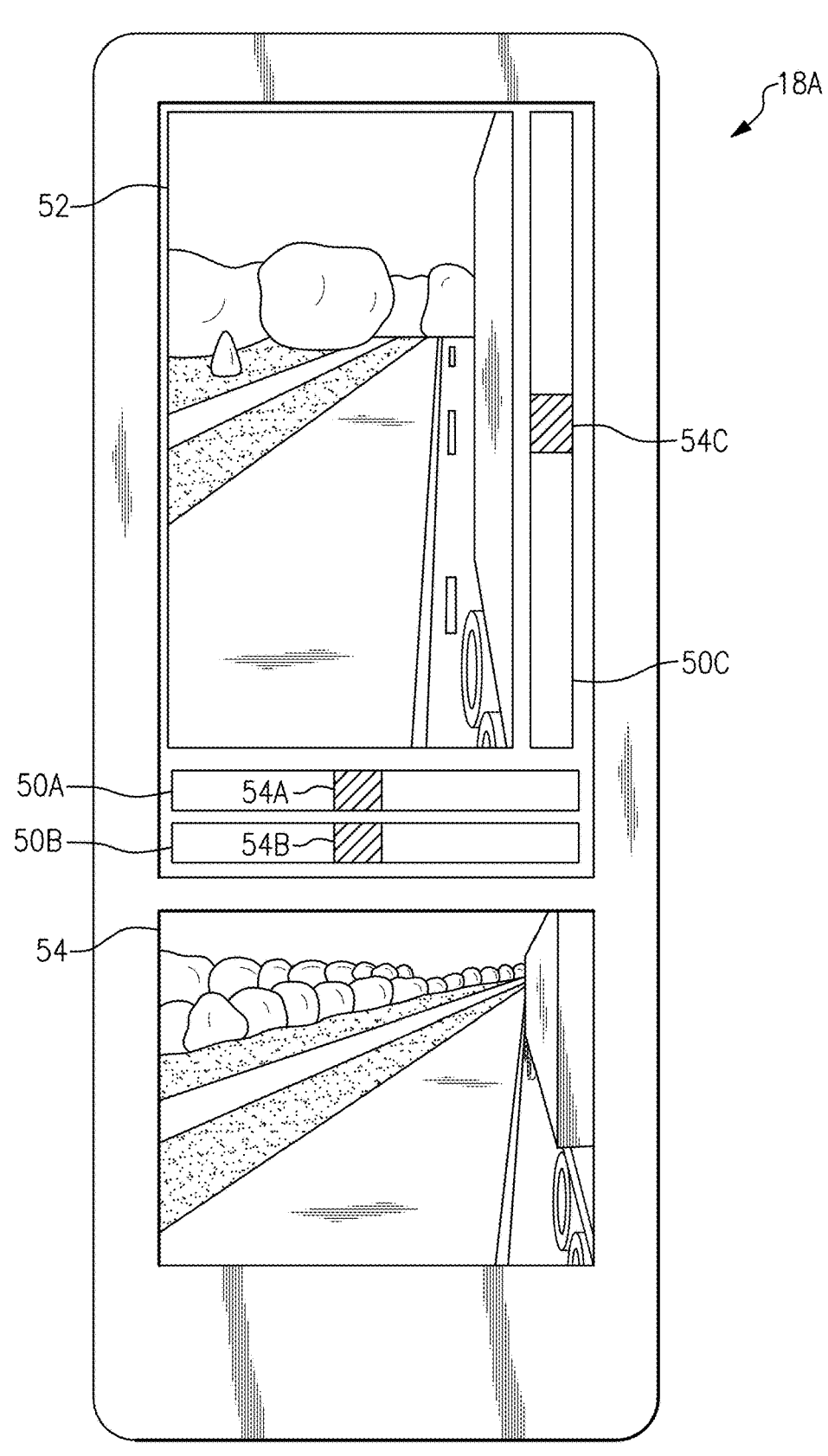
FIG. 6 is a schematic view of an electronic display from FIGS. 1-2 that includes touchscreen HMI elements for providing panning.

FIG. 6 is a schematic view of an electronic display 18A from FIGS. 1-2 that includes touchscreen HMI elements 50A-C for receiving panning commands. The electronic display 18A includes a first display area 52 that provides a Class II view, and includes a second display area 54 that provides a Class IV view.

In the example of FIG. 6, HMI elements 50A-C are provided in display area 52. HMI elements 50A-B are horizontal bars that provide for horizontal panning, with HMI element 50A providing for panning on a first CMS display (e.g., display 18A) and HMI element 50B (which is separate from HMI element 50A) providing for panning on a second CMS display (e.g., display 18B). HMI element 50C is a vertical bar that provides for vertical panning on a CMS display (e.g., display 18A).

In the example of FIG. 6, each HMI element 50A-C includes a corresponding slider 54A-C which may be dragged along its corresponding HMI element 50, and which also indicates a current panning position.

In the example of FIG. 6, CMS display 18A is a touch-screen display that both provides a CMS image feed and also receives touchscreen panning commands. However, it is understood that this is a non-limiting example, and that a separate touchscreen interface could be used.

In one or more embodiments, a single camera 20 is used to provide a Class II and a Class IV view on a side of the commercial vehicle, with the Class II (non-wide angle) view being a cropped version of the Class IV (wide angle) view, and to pan the image feed on one of the plurality of CMS displays 18 from a default view to a panned view, the CMS ECU 22 is configured to adjust the cropping of the larger, non-cropped image (wide angle) feed for said one of the plurality of CMS displays 18 to provide the non-wide angle view.

In one or more embodiments, to pan the image feed on one of the plurality of CMS displays 18 from a default view to a panned view, the CMS ECU 22 is configured to rotate a camera 20 that is providing the image feed on the CMS display 18.

In one or more embodiments, the touchscreen interface includes an additional HMI element (e.g., an icon, button, etc.) that a user can select to manually exit the panning mode, or the user could manually exit the panning mode without an HMI element (e.g., by double clicking).

Although example embodiments have been disclosed, a worker of ordinary skill in this art would recognize that certain modifications would come within the scope of the claims. For that reason, the following claims should be studied to determine their true scope and content.

What is claimed is:

1. A method for providing panning for a camera monitor system (CMS), comprising:

displaying image feeds from a plurality of CMS cameras on a plurality of CMS displays, wherein the image feeds depict an environment surrounding a commercial vehicle;

providing a human-machine interface (HMI) on a touch-screen display, the HMI including a first horizontal bar which controls horizontal panning on a first one of the plurality of CMS displays; and a second horizontal bar which is separate from the first horizontal bar and controls horizontal panning on a second one of the plurality of CMS displays that is different from the first one of the plurality of CMS displays;

receiving at least one panning command through the HMI, the at least one panning command including a first panning command received through with the first horizontal bar, and a second panning command received through the second horizontal bar; and for each of the at least one panning commands received through the HMI, panning the image feed on one of the plurality of CMS displays from a default view to a panned view corresponding to the panning command.

2. The method of claim 1, wherein:

said providing the HMI on the touchscreen display comprises providing a vertical bar on the touchscreen display, which controls vertical panning on the first one of the CMS displays; and said receiving the at least one panning command comprises receiving a third panning command through user interaction with the vertical bar.

3. The method of claim 1, wherein the touchscreen display is the first one of the plurality of CMS displays.

4. The method of claim 1, wherein:

said receiving the at least one panning command comprises receiving a drag command on the HMI in which the user drags their fingertip in a first direction; and said panning the image feed comprises panning the image feed in a second direction that is opposite the first direction to emulate the user having dragged the image feed in the first direction.

5. The method of claim 1, comprising:

determining, based on a property of the commercial vehicle, that the commercial vehicle has likely completed a turn; and automatically exiting the panned view and returning to the default view of the image feed based on the determining.

6. The method of claim 5, wherein said determining comprises:

determining that the commercial vehicle has likely completed a turn based on, while the panned view is being provided, a steering angle or a trailer angle of the commercial vehicle has decreased from being above a predefined angle threshold to being below the predefined angle threshold.

7. The method of claim 5, wherein said determining comprises:

determining that the commercial vehicle has likely completed a turn based on, while the panned view is being provided, a speed of the commercial vehicle has increased from being below a predefined speed threshold to being above the predefined speed threshold.

8. The method of claim 1, wherein:

each image feed is a cropped version of a larger, non-cropped image feed; and said panning comprises adjusting a cropping of the larger, non-cropped image feed for said one of the plurality of CMS displays.

9. A camera monitor system (CMS), comprising:

a plurality of CMS cameras configured to record images of an environment surrounding a vehicle;

a plurality of CMS displays; and a CMS electronic control unit (ECU) configured to:

display image feeds from the plurality of CMS cameras on the plurality of CMS displays;

provide a human-machine interface (HMI) on a touch-screen display, the HMI including:

a first horizontal bar which controls horizontal panning on a first one of the plurality of CMS displays; and a second horizontal bar which is separate from the first horizontal bar and controls horizontal panning on a second one of the plurality of CMS displays that is different from the first one of the plurality of CMS displays;

receive at least one panning command through the HMI, the at least one panning command including a first panning command received through with the first horizontal bar, and a second panning command received through the second horizontal bar; and for each of the at least one panning commands received through the HMI, pan the image feed on one of the plurality of CMS displays from a default view to a panned view corresponding to the panning command.

10. The CMS of claim 9, wherein:

to provide the at least one HMI element on the touchscreen display, the CMS ECU is configured to provide a vertical bar on the touchscreen display, which controls vertical panning on the first one of the CMS displays; and to receive the at least one panning command, the CMS ECU is configured to receive a third panning command through user interaction with the vertical bar.

11. The CMS of claim 9, wherein the touchscreen display is the first one of the plurality of CMS displays.

12. The CMS of claim 9, wherein:

to receive the at least one panning command, the CMS ECU is configured to receive a drag command on the HMI in which the user drags their fingertip in a first direction; and to pan the image feed, the CMS ECU is configured to pan the image feed in a second direction that is opposite the first direction to emulate the user having dragged the image feed in the first direction.

13. The CMS of claim 9, wherein the CMS ECU is configured to:

determine, based on a property of the commercial vehicle, that the commercial vehicle has likely completed a turn; and automatically exit the panned view and return to the default view of the image feed based on the determination.

14. The CMS of claim 13, wherein to determine, based on a property of the commercial vehicle, that the commercial vehicle has likely completed a turn, the CMS ECU is configured to determine that, while the panned view is being provided, a steering angle or a trailer angle of the commercial vehicle has decreased from being above a predefined angle threshold to being below the predefined angle threshold.

15. The CMS of claim 13, wherein to determine, based on a property of the commercial vehicle, that the commercial vehicle has likely completed a turn, the CMS ECU is configured to determine that, while the panned view is being provided, a speed of the commercial vehicle has increased from being below a predefined speed threshold to being above the predefined speed threshold.

16. The CMS of claim 9, wherein:

each image feed is a cropped version of a larger, non-cropped image feed; and to pan the image feed on one of the plurality of CMS displays from a default view to a panned view, the CMS ECU is configured to adjust a cropping of the larger, non-cropped image feed for said one of the plurality of CMS displays.

* * * * *